Oct. 30, 1956 H. S. CAHEN ET AL 2,768,807
VALVE STRUCTURE FOR FAUCET
Filed Dec. 24, 1952

INVENTORS
Herman S. Cahen
BY Alfred B. Cahen

Milburn & Milburn
Attorneys.

United States Patent Office 2,768,807
Patented Oct. 30, 1956

2,768,807

VALVE STRUCTURE FOR FAUCET

Herman S. Cahen and Alfred B. Cahen,
University Heights, Ohio

Application December 24, 1952, Serial No. 327,742

5 Claims. (Cl. 251—218)

This invention relates to the general class of valves and is particularly intended for use in a faucet.

It is no doubt a matter of common knowledge that the gasket in the conventional form of faucet is rather short-lived and has to be renewed quite frequently. This is due to the fact that the gasket and seating means therefor are of such form and arrangement that the gasket is subjected to a rotary grinding action and consequent wear during the closing operation.

It is therefore the object of our present invention to devise a valve structure with a sealing means that will function in a most efficient manner and without being subjected to the grinding action that is characteristic of the conventional faucet. Such wear of course causes the faucet valve to leak.

A further object is to devise a valve structure in which there is provided an improved means for seating and sealing engagement of the gasket upon its seat.

A further object is to devise a valve structure in which there is provided an improved means for not only seating and sealing engagement of the gasket upon its seat but also for centering and accommodating such engagement of the gasket so as to thereby ensure prolonged usage.

Other objects will appear from the following description and claims when considered together with the accompanying drawing.

Figure 1:
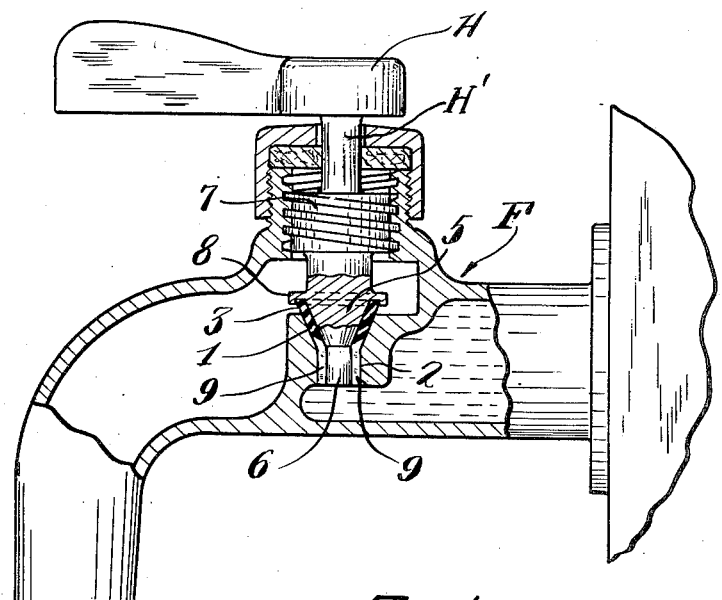
Fig. 1 is a vertical sectional view of our improved valve structure embodied in a faucet which is broken away.

It is to be understood that the present form of disclosure is merely for the purpose of illustration and that there might be devised various modifications thereof without departing from the spirit of our invention as herein set forth and claimed.

Referring now to the accompanying drawing in detail, the conventional form of faucet which is here indicated in a general way by reference letter F, has provided in the present invention a conical seat 1 and a cylindrical portion 2 extending downwardly from the lower end thereof. Within this seat there is adapted to rest a correspondingly formed sealing gasket of rubber or other elastic material. This gasket has an outer conical surface 3 adapted for effective seating engagement upon the conical surface 1 and a cylindrical depending portion 4 that is adapted to be received snugly within the corresponding cylindrical portion 2 of the faucet. As will be observed from the present drawing, this gasket is of plain form at both the upper and lower ends thereof and consequently is entirely free for accommodating and compensating action in the manner to be hereinafter described.

The gasket in our present invention is adapted to be engaged upon its seat by the valve which has a corresponding conical portion 5 and a cylindrical portion 6 depending from the lower or smaller end of the conical portion 5 for snug fit within the cylindrical portion 4 of the gasket. The valve proper has the conventional screw-threaded engagement 7 within the faucet F and is provided with the conventional rotatable handle H.

At the upper end of the conical portion 5 there is provided an annular flange with a depending portion 8 thereabout to serve as a radial and circumferential abutment for the upper edge portion of the gasket. This will maintain the upper edge portion of the gasket in proper assembly and will prevent undue flaring of the same when under compression.

Our present gasket is provided with the open slits 9 extending throughout its cylindrical portion 4 and into its conical portion 3; it being possible to provide as many such slits as may be desired and to arrange them in any desired manner. The purpose of these slits 9 is to increase the radial and circumferential resilience of the gasket as it is engaged by the conical portion 5 and the cylindrical portion 6 of the closure member. With this provision, it is possible to obtain the desired degree of such resilience by employing a harder and better wearing material than would otherwise be possible. Also, there may be permitted proper flow of the water or other liquid when the valve is in open position, even when the gasket adheres to the valve 5—6 in the manner indicated in Fig. 2 of the present drawing.

Figure 2:
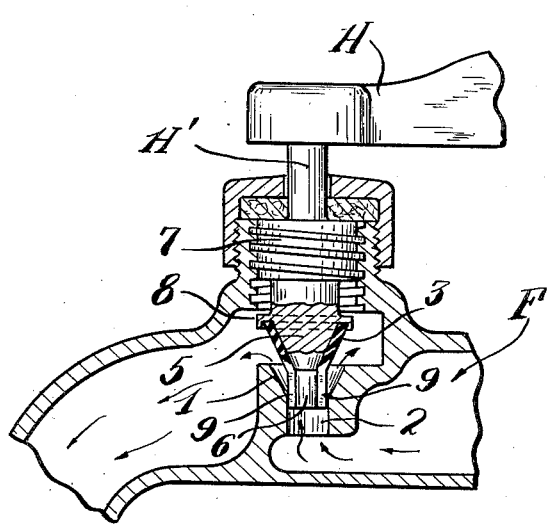
Fig. 2 is a view similar to Fig. 1 except that the valve is shown in open position whereas it is closed in Fig. 1.
Figure 4:
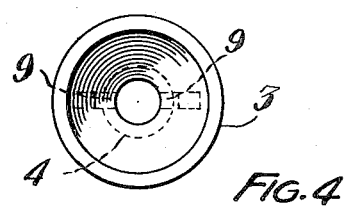
Fig. 4 is a top plan view of the gasket.
Figure 3:
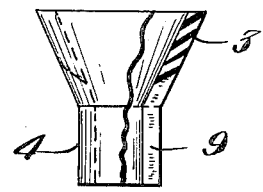
Fig. 3 is a view of our improved gasket, partly in elevation and partly in section.

Upon opening the valve by turning the handle H in the usual manner, the gasket may remain upon its seat or it may adhere to the valve member 5—6 and be carried up off of its seat, as illustrated in Fig. 2 of the present drawing. With the engagement of the upper edge portion of the gasket within the annular seat provided by the flange 8 and also because of the pressure of the fluid against the under-side of the valve member 5—6 and the gasket, it is most likely that the gasket will assume the position indicated in Fig. 2 upon opening the valve. However, by virtue of the conical form of the valve closure member, the gasket and the valve seat and also by virtue of the further permanently centering means afforded by the depending cylindrical portions 4 and 6 upon the gasket and valve member, respectively, during even open position of the valve member, the gasket will always be returned to its proper seating engagement between the valve closure member and the valve seat when the faucet handle is turned towards closing position. That is, the cylindrical portions 4 and 6 will always extend down into the valve opening, as indicated in Fig. 2 of the present drawing. As is generally understood, there is more or less "slop" in the screw-threaded engagement 7 between the handle and faucet body presumably to allow for expansion due to the heat of the hot water and consequently there is danger of the valve cocking and being off-centre with respect to the valve seat when such "slop" is not taken up by the heat of the hot water. With our present structure, however, there is always ensured perfect centering of the valve with respect to its seat due to the combined centering effect of the valve stem H' in its opening and the lower end portions 4 and 6 within the valve opening, as above pointed out. Thus both the upper and lower ends of the valve member always ensure centering engagement of the valve with respect to its seat.

Assuming that the gasket will adhere to the valve member 5—6 upon opening the same, as indicated in Fig. 2 of the present drawing, the upper ends of the slits 9 may be inclined upwardly and outwardly so as to facilitate the free flow of the liquid upwardly and outwardly thereby when the faucet is opened.

As may be understood, the closing of the valve in our present improved structure does not entail any grinding of the gasket upon a seat that would cut the same; but, on the other hand, the extended surface engagement of the gasket between the closure and seat members ensures against any substantial or serious degree of wear even over a prolonged period of time; and, furthermore, our form of structure permits any wear to be taken up by the nesting of the tapering surfaces within each other, such automatically compensating action being permitted to the fullest extent by the plain form of the upper end of the gasket, as above pointed out. This self-accommodation between these interengaging conical surfaces thus provides a means of most effective and dependable seating and sealing engagement at all times and over a prolonged period of usage.

Also, by virtue of the large area of seating and sealing engagement between the closure, gasket and valve seat, there will be required comparatively less turning effort in manipulation of the handle of the closure member and correspondingly less pressure of the valve member upon its seat in order to effect sealing engagement and thus there will be correspondingly less wear upon the gasket; which means that the gasket in our device will have comparatively longer life of dependable operation. Any wear of this gasket will be of a uniform character throughout the entire extent thereof and hence there will always be ensured a uniform manner of sealing engagement when in closed position, as well as uniform clearance when the valve is in open position, regardless of the thickness of the gasket. Moreover, the conical form of our gasket and its seat and the corresponding seating engagement between the same makes possible such dependable sealing with the standard size of the present-day faucet; that is, our extended conical sealing engagement precludes the necessity of a device of larger diameter which would otherwise be required in order to obtain the more dependable sealing effect. Furthermore, the structure of our present form of device is of comparatively simple nature; and other practical advantages will suggest themselves to those who are familiar with the art to which this invention relates.

What we claim is:

1. A valve structure comprising a conical valve seat, a sealing gasket of elastic material having its outer surface of conical form corresponding to that of said seat for engagement thereupon and having its inner surface of substantially corresponding conical form, said gasket having its smaller end provided with open slit means in a direction corresponding to the main longitudinal axis thereof and having its larger end of plain conical form, and a closure member having a conical surface adapted for engagement with the inner conical surface of said gasket so as to exert radially outward distending seating and sealing engagement of said gasket with its seat.

2. A valve structure comprising a member having a conical valve seat portion and a portion forming a cylindrical passage extending from the smaller end of said conical valve seat, a sealing gasket of elastic material having its outer surface of conical form corresponding to that of said seat for engagement thereupon and having its inner surface of substantially corresponding conical form, said gasket having a cylindrical portion extending co-axially from the smaller end of its conical portion for snug engagement within said cylindrical extension from said valve seat and having open slits provided in said cylindrical portion and continuing into the adjoining conical portion thereof in a direction corresponding to the main longitudinal axis thereof, and a closure member having an outer conical surface adapted for engagement with the inner conical surface of said gasket so as to exert radially outward distending seating and sealing engagement of said gasket with its seat and having a cylindrical portion extending from the smaller end of its conical portion for snug engagement within the cylindrical portion of said gasket.

3. The same structure as recited in claim 1 hereof and in which said closure member has an annular flange with an annular portion about the edge thereof for abutting engagement by the larger end portion of said gasket.

4. A valve structure comprising a member having a conical valve seat portion and a portion forming a cylindrical passage extending from the smaller end of said conical valve seat, a sealing gasket of elastic material having its outer surface of conical form corresponding to that of said seat for engagement thereupon and having its inner surface of substantially corresponding conical form, said gasket having a cylindrical portion extending co-axially from the smaller end of said conical portion for snug engagement within the cylindrical extension from said seat and having a plurality of open slits provided in said cylindrical portion and continuing into the adjoining conical portion in a direction corresponding to the main longitudinal axis thereof, and a screw closure member having an outer conical surface adapted for engagement with the inner conical surface of said gasket so as to exert radially outward distending seating and sealing engagement of said gasket with its seat and having a cylindrical portion extending from the smaller end of its conical portion for snug engagement within the cylindrical portion of said gasket, and said closure member having an annular flange with an annular portion about the edge thereof for abutting engagement by the larger end portion of said gasket.

5. In a valve structure, a sealing gasket of elastic material having a portion with concentrically corresponding inner and outer conical surface portions and a cylindrical portion extending co-axially from the smaller end of said conical portion, said gasket being slitted from the end of said cylindrical portion and into the adjoining smaller part of said conical portion in a direction corresponding substantially to the longitudinal axis thereof, and said gasket having its larger end of plain conical form.

References Cited in the file of this patent
UNITED STATES PATENTS

| Number | Name | Date |
|---|---|---|
| 91,618 | Fetter | June 22, 1869 |
| 633,106 | Robuck | Sept. 22, 1899 |
| 650,179 | Knox | May 22, 1900 |
| 906,665 | Stevens et al. | Dec. 15, 1908 |
| 977,723 | Field | Dec. 6, 1910 |
| 978,929 | O'Malley | Dec. 20, 1910 |
| 1,024,961 | Wright | Apr. 30, 1912 |
| 1,174,915 | Walsh | Mar. 7, 1916 |
| 1,919,856 | McGeorge | July 25, 1933 |
| 1,985,382 | Schachter | Dec. 25, 1934 |
| 2,591,274 | Mahoney | Apr. 1, 1952 |